(12) United States Patent
Wang et al.

(10) Patent No.: US 7,205,788 B1
(45) Date of Patent: Apr. 17, 2007

(54) PROGRAMMABLE ON-CHIP DIFFERENTIAL TERMINATION IMPEDANCE

(75) Inventors: Bonnie I. Wang, Cupertino, CA (US); Chiakang Sung, Milpitas, CA (US); Khai Nguyen, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 11/086,979

(22) Filed: Mar. 21, 2005

Related U.S. Application Data

(63) Continuation of application No. 10/622,314, filed on Jul. 17, 2003, now Pat. No. 6,888,369.

(51) Int. Cl.
*H03K 19/003* (2006.01)

(52) U.S. Cl. .............................. 326/30; 326/31; 333/32

(58) Field of Classification Search .................. 326/30, 326/26, 31
See application file for complete search history.

(56) References Cited

U.S. PATENT DOCUMENTS

| | | | |
|---|---|---|---|
| 5,151,611 A | 9/1992 | Rippey | |
| 5,602,494 A | 2/1997 | Sundstrom | |
| 6,037,798 A | 3/2000 | Hedberg | |
| 6,147,520 A * | 11/2000 | Kothandaraman et al. | .... 327/77 |
| 6,366,128 B1 | 4/2002 | Ghia et al. | |
| 6,480,026 B2 | 11/2002 | Andrews et al. | |
| 6,586,964 B1 | 7/2003 | Kent et al. | |
| 6,590,413 B1 | 7/2003 | Yang | |
| 6,603,329 B1 | 8/2003 | Wang et al. | |
| 6,642,740 B2 | 11/2003 | Kim et al. | |
| 6,812,734 B1 * | 11/2004 | Shumarayev et al. | ......... 326/30 |
| 6,812,735 B1 * | 11/2004 | Pham | .......................... 326/30 |

* cited by examiner

*Primary Examiner*—James H. Cho
(74) *Attorney, Agent, or Firm*—Townsend and Townsend and Crew LLP

(57) ABSTRACT

The circuits and methods are provided for impedance termination on an integrated circuit. A network of resistors are formed on an integrated circuit (IC) to provide on-chip impedance termination to differential input/output (IO) pins. Transistors are coupled in the network of termination resistors. The transistors provide additional termination impedance to the differential IO pins. The transistors can be turned ON or OFF separately to change the impedance termination.

11 Claims, 3 Drawing Sheets

PROGRAMMABLE ON-CHIP DIFFERENTIAL TERMINATION IMPEDANCE

CROSS-REFERENCES TO RELATED APPLICATIONS

This application is a continuation of U.S. patent application Ser. No. 10/622,314 filed Jul. 17, 2003, now U.S. Pat. No. 6,888,369, which is incorporated by reference herein.

BACKGROUND OF THE INVENTION

The present invention relates to techniques for providing on-chip termination impedance, and more particularly, to techniques for providing on-chip termination impedance to differential input/output pins.

Integrated circuits have input/output (IO) pins that are used to transmit signals into and out of the circuit. An external termination resistor is usually coupled to each IO pin to provide impedance termination. An impedance termination resistor reduces reflection of input signals on signal lines coupled to the IO pin.

However, external resistors typically use a substantial amount of board space. Therefore, it would be desirable to provide a technique for providing impedance termination for IO pins in an integrated circuit that does not occupy as much board space.

Prior art integrated circuit have provided on-chip termination impedance by coupling a field-effect transistor to an IO pin. The gate voltage of the transistor is controlled by a calibration circuit to regulate the impedance of the on-chip transistor. On-chip transistors have also been applied across differential IO pins to provide impedance termination.

The impedance of on-chip transistors are sensitive to process, voltage, and temperature variations on the integrated circuit. Therefore, it would be desirable to provide on-chip impedance termination that is less sensitive to process, voltage, and temperature variations on an integrated circuit.

BRIEF SUMMARY OF THE INVENTION

The present invention provides circuits and methods for providing impedance termination on an integrated circuit. According to the present invention, a network of resistors are formed on an integrated circuit (IC) to provide on-chip impedance termination to differential input/output (IO) pins. Transistors are coupled in the network of termination resistors. The transistors provide additional termination impedance to the differential IO pins. The transistors can be turned ON or OFF separately to change the impedance termination.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
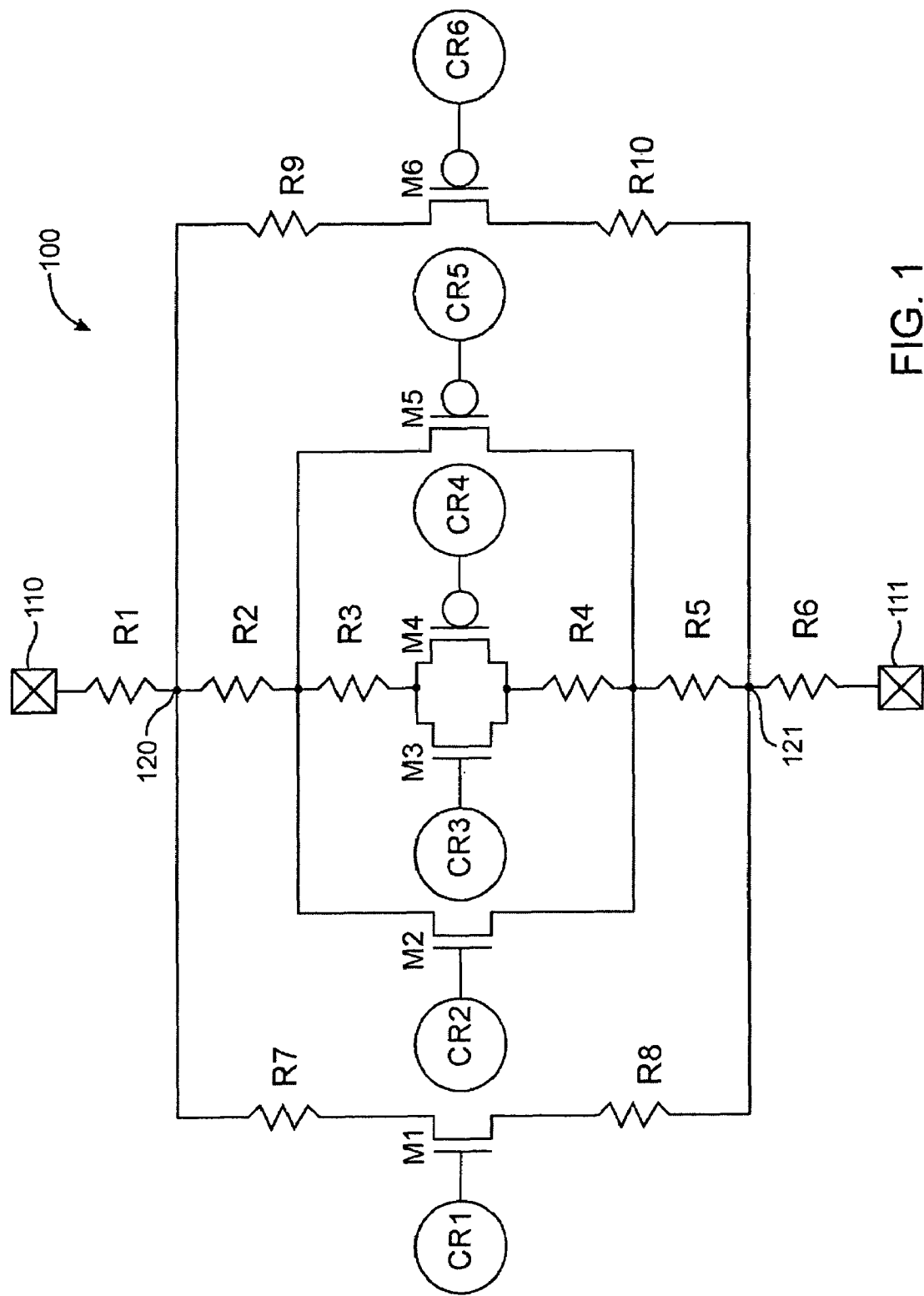
FIG. 1 illustrates an on-chip impedance termination circuit for differential IO pins according to a first embodiment of the present invention.

FIG. 1 illustrates a first embodiment of the present invention. Impedance termination circuit 100 of FIG. 1 is an on-chip circuit that is coupled between two differential IO pins 110–111. Circuit 100 can be formed on an integrated circuit such as an ASIC, a programmable logic device, a field programmable gate array, a programmable logic array, a configurable logic array, etc.

Impedance termination circuit 100 includes resistors R1–R10 and field-effect transistors M1–M6. Any suitable resistor values and transistor sizes can be used in an impedance termination circuit of the present invention. The gates of transistors M1–M6 are coupled to six different memory cells CR1–CR6, respectively. Each of transistors M1–M6 is turned ON and OFF separately by bits stored in memory cells CR1–CR6.

Transistors M1–M6 can be turned ON and OFF by setting the values of the bits stored in memory cells CR1–CR6. Memory cells CR1–CR6 can be programmed by a user of the integrated circuit or by a manufacturer of the integrated circuit. Alternatively, CR1–CR6 can be coupled to external IO pins so that the bits stored in these memory cells can be set and reset by a user.

When memory cells CR1–CR3 are HIGH, n-channel transistors M1–M3 are ON. When memory cells CR1–CR3 are LOW, n-channel transistors M1–M3 are OFF. When memory cells CR4–CR6 are HIGH, p-channel transistors M4–M6 are OFF. When memory cells CR4–CR6 are LOW, p-channel transistors M4–M6 are ON. Any of n-channel transistors M1–M3 can be substituted with p-channel transistors, and any of p-channel transistors M4–M6 transistors can be substituted with n-channel transistors.

Memory cells CR1–CR6 turn transistors M1–M6 ON and OFF to control the impedance of circuit 100. For example, when all of transistors M1–M6 are OFF, the impedance of circuit 100 is infinite in an open circuit condition.

When transistors M1–M2 and M4–M6 are OFF, and transistor M3 is ON, the termination resistance of circuit 100 equals the combined resistance of R1–R6 plus the ON drain-source resistance of transistor M3. Transistor M4 can be turned ON to reduce the resistance added by M3. When transistors M3 and M4 are ON, their ON resistances are coupled in parallel and added to the total impedance of circuit 100.

Transistors M2 and/or M5 can be turned ON by setting memory bits in cells CR2 and CR5 to reduce the resistance of circuit 100. When transistors M2 and M5 are ON, their ON resistances are coupled in parallel with resistors R3 and R4 and transistors M3–M4. If desired, only one of transistors M2 or M5 can be turned ON to provide a smaller reduction in the total resistance of circuit 100.

Transistors M1 and/or M6 can also be turned ON by setting bits in cells CR1 and CR6 to set the resistance of circuit 100. When transistor M1 is ON, resistors R7 and R8 and the ON resistance of transistor M1 are coupled in series. The sum of these three resistances is coupled in parallel with the resistances between node 120 and node 121.

When transistor M6 is ON, resistors R9 and R11 and the ON resistance of transistor M6 are coupled in series. The sum of these three resistances is also coupled in parallel with the resistances between nodes 120 and 121.

A user the circuit 100 can turn anyone or more of transistors M1–M6 ON or OFF independently to increase or decrease the total resistance of circuit 100. The present invention also a user to accurately change the resistance of an on-chip impedance termination circuit by setting bits CR1–CR6 to turn ON or OFF transistors M1–M6. To illustrate, assume that all of resistors R1–R10 are 10 ohms, and the ON resistance of transistors M1–M6 is 10 ohms. If transistors M1, M2, M3, M5, and M6 are OFF and transistor M4 is ON, the total resistance of circuit 100 is R1+R2+R3+$R_{M4}$+R4+R5+R6=70 ohms.

Transistor M3 can be turned ON to decrease the resistance of circuit 100. When transistor M3 is ON, the resistance of circuit 100 is R1+R2+R3+$R_{M||M4}$+R4+R5+R6=65 ohms, where $R_{M3||M4}$ equals $$\frac{R_{M3}R_{R4}}{R_{M3}+R_{M4}}.$$

Transistor M2 can be turned ON to further decrease the resistance of circuit 100. When transistor M2 is ON, the resistance of circuit 100 is R1+R2+$R_X$+R5+R6=47.14 ohms, wherein $R_X$ equals $$\frac{R_{M2}(R_3+R_{M3||M4}+R_4)}{R_{M2}+R_3+R_4+R_{M3||M4}}.$$

When transistor M1 is ON, the resistance of circuit 100 is R1+

$$\frac{(R_7+R_8+R_{M1})(R_2+R_X+R_5)}{R_7+R_8+R_{M1}+R_2+R_X+R_5}+R6=34.25.$$

Transistors M5 and M6 can also be turned ON to further decrease the resistance of circuit 100.

As another example, transistor M6 and/or M1 are ON, and transistors M2–M5 are OFF. As still another example, transistor M2 and/or M5 are ON, and transistors M1, M3–M4, and M6 are OFF. Many other examples are possible.

The resistance of resistors is less sensitive to process, voltage, and temperature variations on an integrated circuit than the ON resistance of transistors. Because resistors R1–R9 provide most of the termination resistance on circuit 100, the termination impedance of circuit 100 is less sensitive to variations in process, voltage, and temperature.

Figure 2:
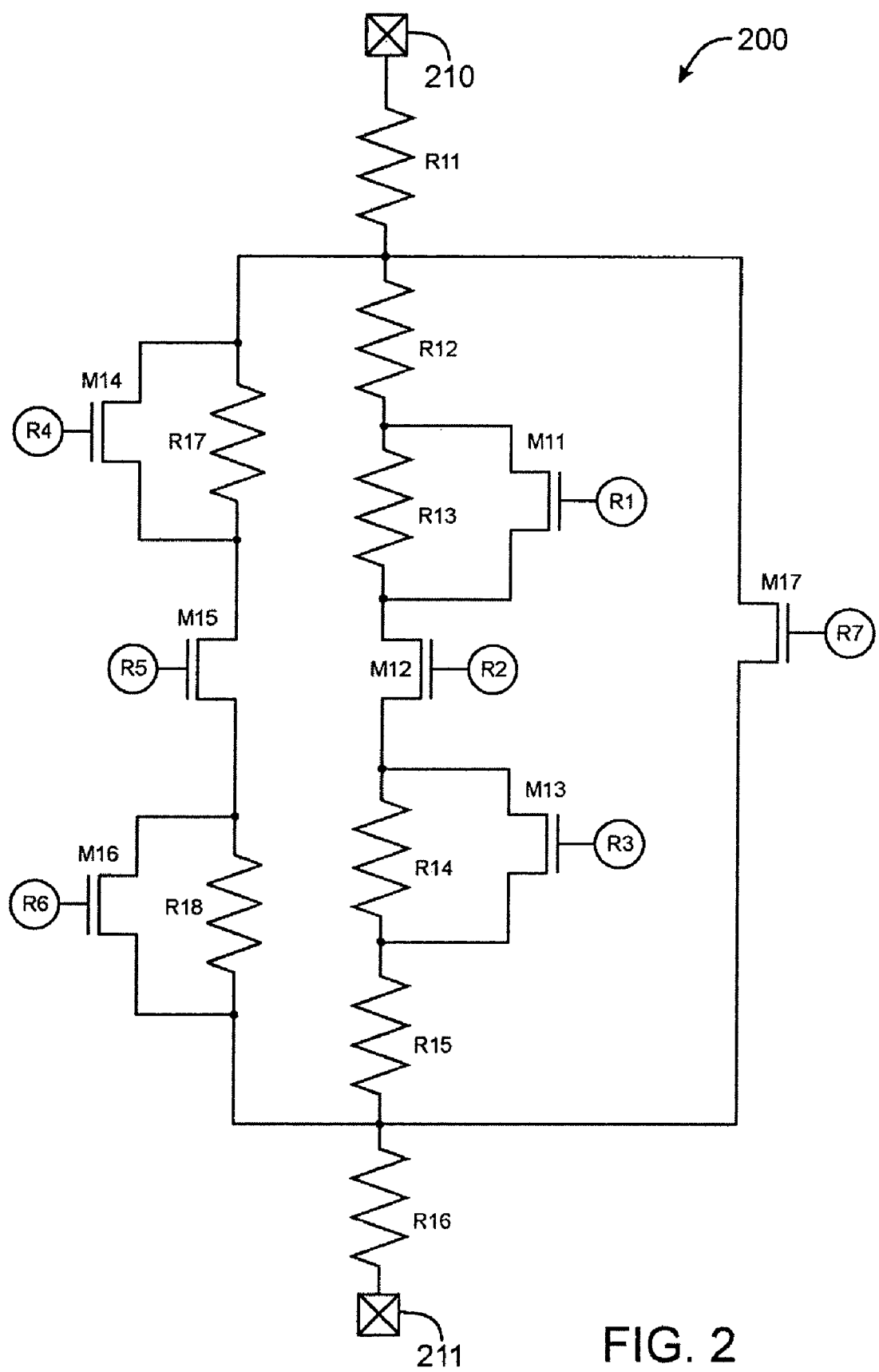
FIG. 2 illustrates an on-chip impedance termination circuit for differential IO pins according to a second embodiment of the present invention.

FIG. 2 illustrates a second embodiment of the present invention. Impedance termination circuit 200 of FIG. 2 includes resistors R11–R18 and n-channel transistors M11–M17. N-channel transistors M11–M17 are controlled by memory cells R1–R7, respectively. A user or a manufacturer stores bits (voltages) in memory cells R1–R7 to select the impedance termination of circuit 200.

If desired, any of n-channel transistors M1–M17 can be substituted for p-channel transistors. Circuit 200 is coupled between differential IO pins 210–211. Transistors M12, M15, and M17 can be turned OFF to create an infinite impedance (an open circuit condition) in circuit 200.

When transistors M11, M13, M15, and M17 are OFF, the total resistance of circuit 200 is R11+R12+R13+R14+R15+R16+$R_{M12}$. Any appropriate resistance values can be selected for R11–R18. Any one or more of transistors M11–M17 can be turned ON to reduce the resistance of circuit 200. For example, transistor M11 can be turned ON to reduce the net resistance across R13. As another example, transistor M17 can be turned ON to reduce the net resistance across resistors R12–R15. As another example, a user can select the impedance of circuit 100 or 200 to match the impedance of transmission lines coupled to the differential IO pins to reduce or eliminate reflection on the transmission lines.

Separate impedance termination circuits such as the embodiments shown in FIGS. 1 and 2 can be provided across each pair of differential IO pins on an integrated circuit.

FIGS. 1 and 2 are merely two examples of the impedance termination circuits of the present invention and are not intended to limit the scope of the present invention. The present invention also includes many different variations and embodiments of selectable on-chip termination impedance circuits coupled between differential IO pins. On-chip impedance termination circuits of the present invention can be fabricated on an integrated circuit such as a ASIC, a field programmable gate array (FPGA), or a programmable logic device (PLD).

Figure 3:
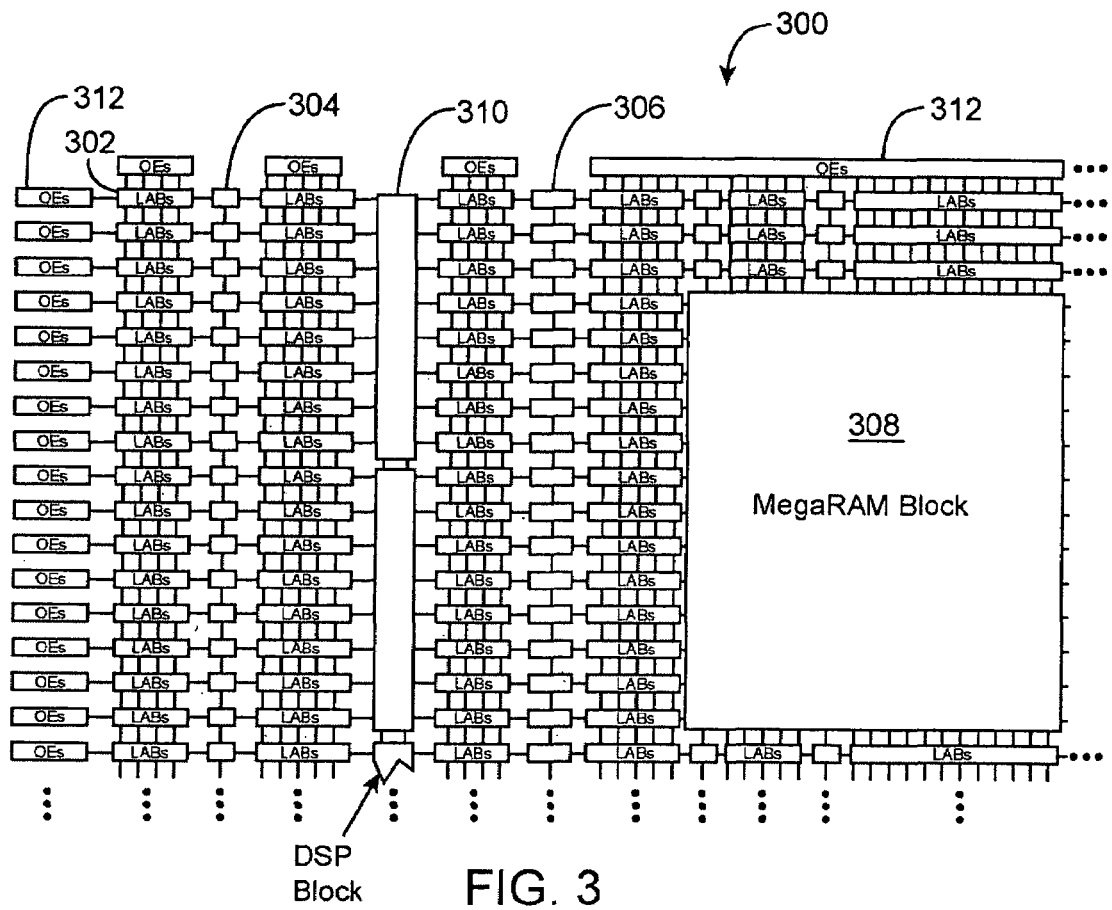
FIG. 3 is a simplified block diagram of a programmable logic device that can implement embodiments of the present invention.

FIG. 3 is a simplified partial block diagram of an exemplary high-density PLD 300 wherein impedance termination circuits the present invention can be utilized. PLD 300 includes a two-dimensional array of programmable logic array blocks (or LABs) 302 that are interconnected by a network of column and row interconnects of varying length and speed. LABs 302 include multiple (e.g., 10) logic elements (or LEs), an LE being a small unit of logic that provides for efficient implementation of user defined logic functions.

PLD 300 also includes a distributed memory structure including RAM blocks of varying sizes provided throughout the array. The RAM blocks include, for example, 512 bit blocks 304, 4K blocks 306 and a MegaBlock 308 providing 512K bits of RAM. These memory blocks can also include shift registers and FIFO buffers. PLD 300 further includes digital signal processing (DSP) blocks 310 that can implement, for example, multipliers with add or subtract features. I/O elements (IOEs) 312 located, in this example, around the periphery of the device support numerous single-ended and differential I/O standards. It is to be understood that PLD 300 is described herein for illustrative purposes only and that the present invention can be implemented in many different types of PLDs, FPGAs, and the like.

Figure 4:
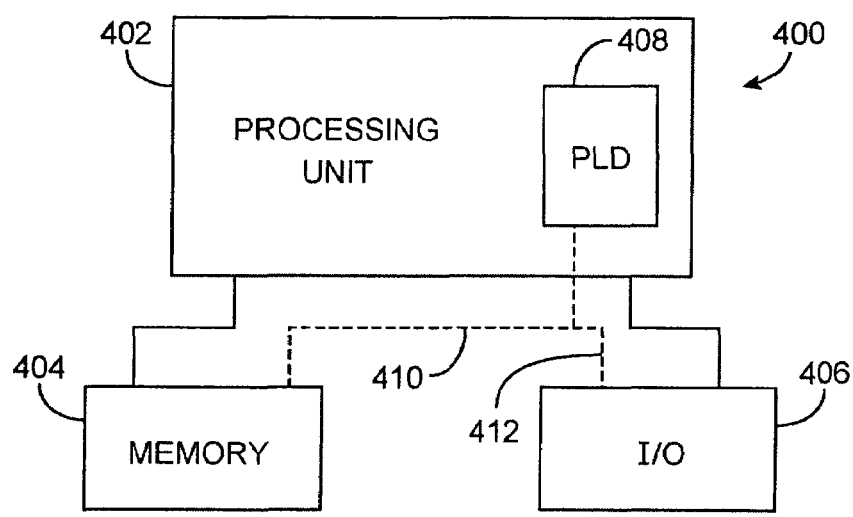
FIG. 4 is a block diagram of an electronic system that can implement embodiments of the present invention.

While PLDs of the type shown in FIG. 3 provide many of the resources required to implement system level solutions, the present invention can also benefit systems wherein a PLD is one of several components. FIG. 4 shows a block diagram of an exemplary digital system 400, within which the present invention can be embodied. System 400 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 400 can be provided on a single board, on multiple boards, or within multiple enclosures.

System 400 includes a processing unit 402, a memory unit 404 and an I/O unit 406 interconnected together by one or more buses. According to this exemplary embodiment, a programmable logic device (PLD) 408 is embedded in processing unit 402. PLD 408 can serve many different purposes within the system in FIG. 4. PLD 408 can, for example, be a logical building block of processing unit 402, supporting its internal and external operations. PLD 408 is programmed to implement the logical functions necessary to carry on its particular role in system operation. PLD 408 can be specially coupled to memory 404 through connection 410 and to I/O unit 406 through connection 412.

Processing unit 402 can direct data to an appropriate system component for processing or storage, execute a program stored in memory 404 or receive and transmit data via I/O unit 406, or other similar function. Processing unit 402 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLDs 408 can control the logical operations of the system. In an embodiment, PLD 408 acts as a reconfigurable processor, which can be reprogrammed as needed to handle a particular computing task. Alternately, programmable logic device 408 can itself include an embedded microprocessor. Memory unit 404 can be a random access memory (RAM), read only memory (ROM), fixed or flexible disk media, PC Card flash disk memory, tape, or any other storage means, or any combination of these storage means.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications can be made to adapt a particular configuration or method disclosed, without departing from the essential scope and spirit of the present invention. It is intended that the invention not be limited to the particular embodiment disclosed, but that the invention will include all embodiments and equivalents falling within the scope of the claims.

What is claimed is:

1. An integrated circuit comprising:
   a first pad;
   a second pad;
   a differential buffer coupled to the first pad and the second pad; and
   a differential termination impedance circuit coupled between the first pad and the second pad and comprising:
   a first resistance;
   a second resistance having a first terminal connected directly to a first terminal of the first resistance;
   a first active device having a first source/drain region connected directly to the first terminal of the first resistance and the first terminal of the second resistance; and
   a second active device having a first source/drain region coupled to a second terminal of the second resistance;
   a third resistance having a first terminal coupled to a second source/drain region of the second active device and a second terminal directly connected to a second source/drain region of the first active device; and
   a third active device having a first source/drain region coupled to the second terminal of the second resistance and a second source/drain region coupled to the first terminal of the third resistance.

2. The integrated circuit of claim 1 wherein the first and second resistances each consist of a single resistor.

3. The integrated circuit of claim 1 wherein the first and second resistances each consist of a plurality of resistors.

4. The integrated circuit of claim 1 further comprising:
   a storage cell coupled to the gate of the first active device.

5. The integrated circuit of claim 4 wherein the storage cell is a memory cell.

6. The integrated circuit of claim 1 further comprising:
   a fourth resistance having a first terminal directly connected to the second terminal of the third resistance and the second source/drain region of the first active device.

7. The integrated circuit of claim 1 wherein the differential buffer is an input buffer.

8. The integrated circuit of claim 1 wherein the differential buffer is an output buffer.

9. The integrated circuit of claim 1 further comprising:
   a plurality of programmable logic elements; and
   a plurality of programmable interconnect lines,
   wherein the programmable logic elements and programmable interconnect lines are configurable to implement user-defined logic functions.

10. The integrated circuit of claim 1 further comprising:
    a first memory cell coupled to the gate of the first active device; and
    a second memory cell coupled to the gate of the second active device.

11. The integrated circuit of claim 1 wherein the integrated circuit is a field programmable gate array.

* * * * *